United States Patent [19]

Budde et al.

[11] Patent Number: 4,503,535
[45] Date of Patent: Mar. 5, 1985

[54] APPARATUS FOR RECOVERY FROM FAILURES IN A MULTIPROCESSING SYSTEM

[75] Inventors: David L. Budde, Portland; David G. Carson, Hillsboro, both of Oreg.; Anthony L. Cornish, Essex, England; David B. Johnson; Craig B. Peterson, both of Portland, Oreg.

[73] Assignee: Intel Corporation, Santa Clara, Calif.

[21] Appl. No.: 393,906

[22] Filed: Jun. 30, 1982

[51] Int. Cl.³ .............................................. G06F 11/00
[52] U.S. Cl. ...................................... 371/11; 364/200
[58] Field of Search .................. 364/200, 900; 371/11, 371/9, 10, 8

[56] References Cited

U.S. PATENT DOCUMENTS

| 4,015,246 | 3/1977 | Hopkins et al. | 371/9 |
|---|---|---|---|
| 4,191,996 | 3/1980 | Chesley et al. | 371/9 |
| 4,347,563 | 8/1982 | Poredes et al. | 371/9 |
| 4,371,754 | 2/1983 | De et al. | 371/9 |
| 4,412,281 | 10/1983 | Works | 371/9 |
| 4,438,494 | 3/1984 | Budde et al. | 371/11 |

Primary Examiner—Jerry Smith
Assistant Examiner—Michael R. Fleming
Attorney, Agent, or Firm—Owen L. Lamb

[57] ABSTRACT

A number of intelligent nodes (bus interface units-BIUs and memory control units-MCUs) are provided in a matrix composed of processor buses (105) with corresponding error-reporting and control lines (106); and memory buses (107) with corresponding error-reporting and control lines (108). Error-detection mechanisms deal with information flow occuring across area boundaries. Each node (100, 101, 102, 103) has means for logging errors and reporting errors on the error report lines (106, 108). If an error recurs the node at which the error exists initiates an error message which is received and repropagated on the error report lines by all nodes. The error message identifies the type of error and the node ID at which the error was detected. Confinement area isolation logic in a node isolates a faulty confinement area of which the node is a part, upon the condition that the node ID in an error report message identifies the node as a node which is a part of a faulty confinement area. Logic in the node reconfigures at least part of the system upon the condition that the node ID in the error report message identifies the node as a node which is part of a confinement area which should be recofigured to recover from the error reported in the error report message.

6 Claims, 8 Drawing Figures

APPARATUS FOR RECOVERY FROM FAILURES IN A MULTIPROCESSING SYSTEM

CROSS REFERENCES TO RELATED APPLICATIONS

Application Ser. No. 290,135, (a continuation of Ser. No. 972,010, filed Dec. 21, 1978) entitled "Interprocessor Communication System," by George Cox et al., filed Aug. 5, 1981 and assigned to Intel Corporation.

Application Ser. No. 235,470, "Microprocessor Providing an Interface between a Peripheral Subsystem and an Object-Oriented Data Processor," of John A. Bayliss et al., filed Feb. 18, 1981 and assigned to Intel Corporation.

Application Ser. No. 296,025, "Method and Apparatus of Fault-Handling in a Multiprocessing System," by David Budde et al., filed on Aug. 25, 1981 and assigned to Intel Corporation.

Application Ser. No. 119,433, "Macroinstruction Translator Unit," of John A. Bayliss et al., filed on Feb. 7, 1980 and assigned to Intel Corporation.

Application Ser. No. 119,432, "Macroinstruction Execution Unit," of David Budde et al., filed on Feb. 7, 1980 and assigned to Intel Corporation.

Application Ser. No. 336,866, "Interface for use Between a Memory and Components of a Module Switching Apparatus" of David Budde et al., filed on Jan. 4, 1982.

Application Ser. No. 342,837, "Arbitration Means for Controlling Access to a Bus Shared by a Number of Modules" of David Budde et al., filed on Jan. 26, 1982.

Application Ser. No. 393,905, "Apparatus for Redundant Operation of Modules in a Multiprocessing System" of David L. Budde, et al., filed on June 30, 1982.

U.S. Pat. No. 4,176,258, "Method and Circuit for Checking Integrated Circuit Chips" of Daniel K. Jackson, granted Nov. 27, 1979 and assigned to Intel Corporation.

U.S. Pat. No. 4,315,308, "Interface Between a Microprocessor Chip and Peripheral Subsystems" of Daniel K. Jackson, granted Feb. 9, 1982 and assigned to Intel Corporation.

U.S. Pat. No. 4,315,310, "Input/Output Data Processing System" of John A. Bayliss et al., granted Feb. 9, 1982 and assigned to Intel Corporation.

U.S. Pat. No. 4,325,120, "Data Processing System" of Stephen Colley et al., granted Apr. 13, 1982 and assigned to Intel Corporation.

BACKGROUND OF THE INVENTION

1. Field of Invention

This invention relates to multiprocessing systems and more particularly to means for recovering from failures in part of the system.

2. Description of the Prior Art

With the advent of Very Large-Scale Integrated circuit (VLSI) technology there has arisen a corresponding need for new fault-handling methods and apparatus, uniquely adapted to the requirements of the new technology.

In data processing systems, fault-handling cycles have three phases: a fault occurs, the fault is detected, and then a recovery procedure is activated. As decribed in the above-identified Budde, et al. application Ser. No. 296,025, now U.S. Pat. No. 4,438,494 the detection phase may include detection, diagnosis, logging, and reporting of the fault. During this phase, system resources detect the presence and extent of the failure and pass this information on to recovery mechanisms. After fault detection, the recovery mechanisms are employed to mask the effects of the fault from the rest of the system and possibly isolate and repair the faulty subsystem.

A system is made up of a hierarchy of levels of fault-handling cycles. Faults can occur at many different levels in the system. Each level has its own characteristics. Faults not handled at one level will propagate up to the higher levels in the system. Higher levels have more complex environments which make recovery a more complex and slow task. Failure modes increase in complexity, the interaction between subsystems grows, and the original source of the failure becomes more ambiguous.

It is an object of the present invention to provide a recovery mechanism in which recovery from faults is accomplished at the lowest possible level.

By performing detection and recovery from hardware failures at a low level in the system, a more general and complete solution is possible to the problems of handling system failures. This approach divides the responsibilities of fault tolerance, allowing faster and simpler solutions to fault recovery. The mechanisms for detection and recovery from software errors need only address the set of faults that can be generated at those levels. By controlling and reducing the amount of errors that are reflected up to the next level, parallel and independent development may proceed on different levels (hardware, system software, applications). The designers at one level can assume that lower levels will always provide consistent and correct operation.

It is desirable that all of the fault-handling mechanisms, both detection and recovery mechanism, be orthogonal, so that expansion of bus bandwidth, logical resources, detection capabilities, or redundancy may be done without any side effects on the rest of the system.

It is therefore a further object of the present invention to provide a recovery mechanism that enables a system to have a very flexible and modular basis for growth and adaptation to the application environment, such that system capabilities may be added or removed without any impact on the application software.

SUMMARY OF THE INVENTION

Briefly, the above objects are accomplished in accordance with the invention by providing a recovery mechanism for use with an error-reporting matrix, which matrix includes horizontal bus error-report lines and vertical module error-report lines. Error-reporting means are connected at nodes at the intersection of the bus error-report lines and module error-report lines. The error-reporting means includes means for receiving error messages transmitted to the node over the error-report lines. The error-reporting means further includes means for propagating error messages over the error-report lines to other reporting means located at other nodes in the matrix. In this manner every node is made aware of an error detected at any one node.

The system is divided into a number of confinement areas, and errors detected in a particular area are reported and identified by a node associated with that particular area.

In accordance with the invention, recovery mechanisms are replicated at each node and hence each confinement area, thereby distributing the hardware and eliminating the need for a central software or hardware monitor for recovery operations.

In accordance with an aspect of the invention, a method of recovery is provided wherein a shadow module can be substituted for a primary module upon the detection of an error in the primary module.

A system constructed in accordance with the teachings of the present invention has the advantage that if a standby shadow module is provided which maintains the state of the primary module and guarantees the state and all access paths thereto to be correct, redundant processor-to-memory paths may be provided with means for dynamically mapping logical paths over redundant physical paths.

In accordance with an aspect of the invention, once an identification is made of which bus module is faulty, deactivation of the bus and rerouting to traffic to bypass the module, and termination of process execution on a bypassed module, may be carried out.

In accordance with a further aspect of the invention, redundant memory buses, processor modules, and memory modules to support system reconfiguration are provided. A memory-control unit is provided with means to connect onto a second memory bus different from its usual memory bus when an error condition exists. In this manner processor requests to the memory are rerouted around the faulty bus.

The invention has the advantage that system operation may commence again, possibly in a degraded mode.

The invention has the further advantage that there is no penalty in performance, cost, or system size for those fault-tolerant mechanisms not used in a system.

BRIEF DESCRIPTION OF THE DRAWINGS

The foregoing and other objects, features, and advantages of the invention will be apparent from the following detailed description of a preferred embodiment of the invention as illustrated in the accompanying drawings wherein.

DETAILED DESCRIPTION

Figure 1:
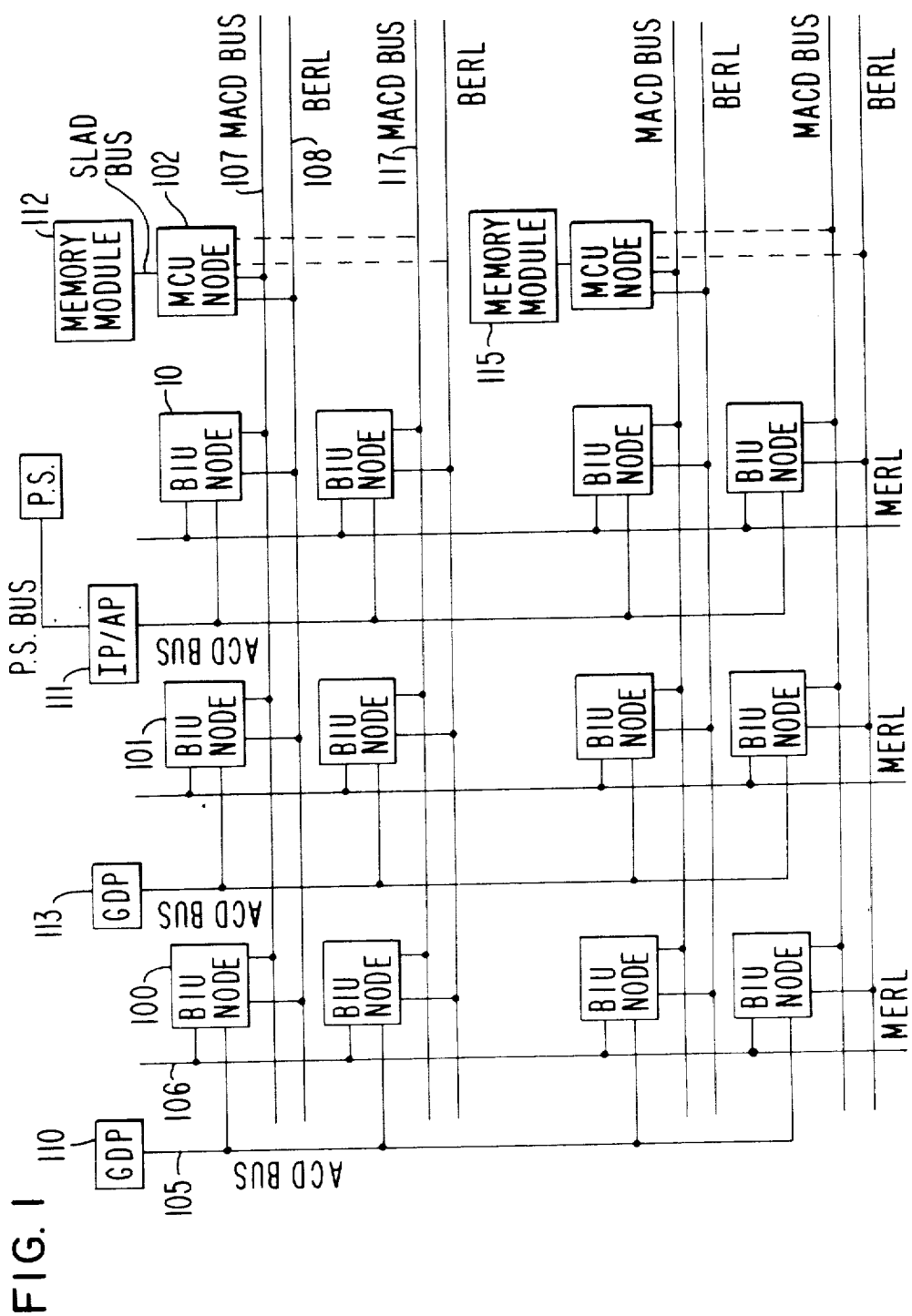
FIG. 1 is a diagram of a data processing system in which the recovery mechanism of the present invention is embodied.

FIG. 1 is a diagram of a data processing system employing an interconnect mechanism in which the recovery mechanism of the present invention is embodied. The interconnect mechanism provides data processors with connection and access capability to a main memory. The interconnect mechanism is more fully described in the above-referenced application Ser. No. 296,025 of David Budde et al.

There are three module types in the central system: GDP (generalized data processor), IP (interface processor with an associated attached processor, AP), and Memory. All GDP modules (110, 113) are identical; thus, any GDP module can act as a shadow (backup resource) for any other GDP. Each IP module (111) provides an interface between the central system and one I/O peripheray subsystem (PS). All IP modules have identical interfaces into the central system, but potentially different I/O subsystem interfaces. To act as a backup resource, the IP module must interface to the same AP. Memory modules (112) are only attached to two memory buses, the primary (107) and backup (117) buses via an MCU (102). Backup memory modules (not shown) must be attached to the same two memory buses.

The interconnect mechanism is comprised of two Very Large-Scale Integrated-circuit (VLSI) chips. One chip is a bus interface unit (BIU-100), and the other chip is a memory-control unit (MCU-102). Throughout this description the term node is used to refer to either a BIU or an MCU.

The interconnect mechanism is a system of orthogonal lines arranged in a matrix. This matrix is composed of processor buses (ACD) and corresponding control lines, and memory buses (MACD) and corresponding control lines. At the intersection of these lines there is a bus interface unit (BIU, for example, 100). The bus interface unit responds to access requests from a processor (110), received over the processor bus, and routes the requests onto the appropriate memory bus for distribution to the correct segment of the address space in a memory module (112). Similarly, reply messages from a memory module are routed onto the memory bus by the Memory Control Unit (MCU-102). In response to a reply message, the appropriate bus interface unit selects and switches the data onto the processor bus in correct sequence.

Each processor bus supports one Generalized Data Processor (GDP-110) or one I/O Processor/Attached Processor (IP/AP) pair (111). The processor bus makes connection to the interconnect system on the processor side of the bus interface unit (100). The processor bus is described in detail in the above-referenced Daniel K. Jackson U.S. Pat. No. 4,315,308. The GDP (110) is described in detail in the above-referenced Stephen Colley et al. U.S. Pat. No. 4,325,120. The IP (111) is described in detail in the above-referenced John A. Bayliss et al. U.S. Pat. No. 4,315,310.

Each memory bus supports one or more memory modules (112). Each memory module is connected to the memory bus through the Memory Control Unit (MCU, 102). The MCU works together with the bus interface unit in routing accesses. Each MCU controls a single dynamic memory array. As access requests are passed along the memory bus, the MCU selects and responds to those requests directed to addresses within the address space of the array it controls.

Since GDP processors make variable-length accesses on any byte boundary, single accesses will sometimes span two memory buses. A time-ordered memory bus arbitration scheme described in the above-identified Budde, et al. application Ser. No. 342,837 guarantees access indivisibility.

BUS INTERFACE UNIT (BIU) NODES

The primary function of the bus interface unit (100, 102, etc.) of FIG. 1 is to pass memory requests from a processor (110 or 111) to an attached memory module (112) and to return to the processor any requested data.

As described in the above-identified Budde, et al. application Ser. No. 336,866, the bus interface unit (called a crossbar in the Budde et al. application) is composed of a number of state machines. The fault machine (400) of the BIU is shown in detail in FIG. 2 of this specification.

At system reset time, the bus interface unit is supplied with enough information to define its functionality in the system environment. During assertion of INIT# (cold reset time), initialization and configuration information is brought on chip.

To establish addressing coordinates for individual bus-interface units in the bus interface unit interconnection scheme, each processor bus is assigned a unique number at initialization (INIT#) time. This number cannot be changed without INIT# assertion, and is one coordinate of the physical node address ID (135, FIG. 2) for the bus-interface unit. The other coordinate is the memory-bus number. Processor-type interconnect components may inquire as to the type of processor attached to any bus-interface unit by local accesses to the BIU. As such, the processor type (identical to the GDP system architectural processor class referred to in the above-referenced Colley, et al. U.S. Pat. No. 4,325,120 is provided to the BIU at INIT# time. This data is required and cannot be changed without INIT# assertion. This field allows system resource determination by the recovery mechanism described subsequently.

MEMORY-CONTROL UNIT (MCU) NODES

As shown in FIG. 1 and as described in the above-identified Budde, et al. application Ser. No. 336,866, the MCU (102) attaches to the memory bus (MACD-107), which provides the main communication path of the interconnect system, and to the BERL line (108) of the error-reporting matrix. The fault machine (400) of the MCU identical to the fault machine of the BIU shown in detail in FIG. 2. In the MCU no MERL connections are needed, so the MERL receiver (132) is disabled.

The MCU receives variable-length access requests at its memory bus interface from a bus-interface unit on the MACD bus and makes the proper series of accesses to the memory (112) through its storage bus interface. After completion of the accesses to memory, the MCU returns the proper reply on the MACD bus.

The access types that are supported by the MACD bus are: read, write, read-modify-write (RMW)-read, RMW-write, register read, and register write, together with certain specific control messages called blurbs (e.g., IPCs—interprocessor communications of the type described in the above-referenced Jackson U.S. Pat. No. 4,315,308). The accesses corresponding to these access types are handled on the memory bus with a series of messages transmitted under a specific control protocol, as described in the above-identified Budde, et al. application Ser. No. 336,866. All users of the MACD bus (bus-interface units and MCUs) must arbitrate for the right to place a message on the bus, as described below and more fully in the above-identified Budde, et al. application Ser. No. 342,837.

All memory write operations are carried out as read-modify-writes (RMW). The reason for this is to allow the ECC address check prior to doing the write so as to guarantee that a write will never occur at the wrong address. This locks the memory up on an address that can be verified through an ECC check. After the check demonstrates that no error has occured on the address lines, and the new storage word and check bits have been generated, the data is presented to the memory module (112) in the same order that read data is received, and the Write Enable line to the memory module is pulsed.

MACD BUS ARBITRATION

The arbitration mechanism described in the above-identified Budde, et al. application Ser. No. 342,837, is comprised of a request FIFO for storing access request status information (ones and zeros) corresponding to received access requests in the order that they are made. A one indicates that the request was made by the node in which the FIFO is located, and a zero indicates that the request was made by one of the other nodes. The request status information from the other nodes is received over a NREQ# signal line connected between the nodes. This logic separates multiple requests into time-ordered slots, such that all requests in a particular time slot may be serviced before any requests in the next time slot.

A store stores the unique logical node number, described previously. An arbiter examines this logical number bit-by-bit in successive cycles and places a one in a grant queue upon the condition that the bit examined in a particular cycle is a zero and signals this condition over a RQOUT signal line to the other nodes. If the bit examined in a particular cycle is a one the arbiter drops out of contention and signals this condition over the RQOUT line to the other nodes. This logic orders multiple requests within a single time slot, which requests are made by muliple nodes, in accordance with the logical node numbers of the nodes making the requests.

The grant queue stores status information (ones and zeros) corresponding to granted requests in the order that they are granted. A one indicating that the granted request was granted to the node in which the grant queue is located, and a zero indicating that the granted request was granted to one of the other nodes. The granted-request-status information from the other nodes is received over a RQ# signal line and a CONT# signal line. This logic separates multiple granted requests such that only one request corresponding to a particular node is at the head of any one grant queue at any one time.

Since requests and replies always come in pairs, the ordering of replies is accomplished by stipulating that replies must return in the same order as their corresponding requests were made. A request FIFO in the MCU stores requests in the order that they are made. Both requests and replies are thusly fully ordered, such that at any one time there is only one request and one reply that can go onto the MACD bus.

The MACD bus is used for both request and reply messages. While an MCU does not send request messages, it must contend for MACD bus access along with the bus-interface units in order to place a reply message on the bus. Therefore an arbitration mechanism without a time-ordered queue is implemented in the MCU.

MESSAGES

Messages, separated into message types (requests, replies, and bus blurbs) that can be sent over the memory bus between the bus-interface unit and MCU, are listed below and are fully described in the above-identified Budde, et al. application Ser. No. 336,866.

Request Messages:
- Memory Read Request
- Memory RMW Read Request
- Memory Write Request
- Memory RMW Write Request
- Interconnect Register Read Request
- Interconnect Register Write Request
- Force Bad ECC (FBE) Request Reply Messages:
- Read Reply
- Write Acknowledge
- Memory RMW Write Acknowledge
- Memory RMW Read Locked Reply Bus Blurbs:
- IPC

MEMORY ACCESS PROCEDURE

Memory accesses are received from a processor by all bus-interface units in a column over the ACD bus, strobed by ISA, in accordance with the ACD bus protocol described in the above-referenced Jackson U.S. Pat. No. 4,315,308. When an access is detected, a bus-interface unit will perform the following operations which are described more fully in the above-identified Budde, et al. application Ser. No. 336,866:

1. Access Recognition: Determine participation, referring to memory starting and ending addresses and to the interleave type and value;
2. Arbitration: Arbitrate for access to the memory bus;
3. Grant: Issue a memory bus access, with appropriate address and length, as required to perform its part of the processor bus request;
4. Release: Release memory bus to further requesters;
5. Wait for response;
6. Accept reply, as required.

ERROR DETECTION

Appropriate response to hardware-error conditions is based upon a confinement area concept which partitions the interconnect system of FIG. 1 into a number of areas, shown in detail in the above-identified Budde, et al. application Ser. No. 296,025, and summarized in the following paragraphs. The confinement areas provide error detection mechanisms appropriate to deal with the kind of information flowing across the boundaries.

There is a confinement area for each module and memory bus in a system. Thus, when an error is detected, it is confined to one of the system building blocks. This allows the recovery and repair strategies to be built around the replacement of system building blocks. When a module or bus has its confinement mechanisms activated, it can be viewed as a self-checking unit. The operation of a self-checking unit is designed so that no inconsistent data will be allowed to leave the unit and corrupt another confinement area. Detection mechanisms reside at every interface, and all data is checked as it flows across the interface between confinement areas.

The GDP confinement area is exactly the same as the GDP module. The only interfaces to a GDP confinement area are the memory buses. The BIUs are responsible for checking all of the information which leaves the GDP module. No information (control, address, or data) can leave a GDP confinement area without first being checked for correctness by one of the BIUs in the module. Error detection is performed by duplicating the GDP module using a process called functional redundancy checking (FRC) as described in the above-identified U.S. Pat. No. 4,176,258, of Daniel K. Jackson.

The IP confinement area is exactly the same as the IP module. An IP module has interfaces to the memory buses in the system, plus an interface to an external I/O subsystem. The interfaces to the memory buses are checked by the BIUs in the same manner as was described for the GDP confinement area. The IP component is responsible for checking any data which leaves the confinement area via the peripheral subsystem (PS) bus. No information can leave an IP confinement area without first being checked for correctness by one of the BIUs or by the IP. The peripheral subsystem is not a confinement area. The application hardware or software must apply its own detection mechanisms to this subsystem. Error detection is performed by duplicating the IP module as described in the above-identified U.S. Pat. No. 4,176,258, of Daniel K. Jackson.

The memory confinement area is exactly the same as the memory module. A memory module has interfaces to two of the memory buses in the system. The MCU is responsible for checking all information which leaves the memory confinement area. No information can leave the confinement area without first being checked for correctness by the MCU. Error detection is performed by duplicating the MCU as described in the above-identified U.S. Pat. No. 4,176,258, of Daniel K. Jackson and by applying an ECC code to the memory array.

Each memory bus confinement area includes a memory bus and the interface logic residing in the BIUs and MCUs attached to the memory bus. Each memory bus has interfaces to all of the GDP and IP modules plus some of the memory modules. Each node (BIU or MCU) which is attached to this bus is responsible for checking all of the information which flows off the memory bus and into its module. No information can leave the memory bus and enter a module without first being checked for correctness by either a BIU or a MCU. Error detection is performed primarily by parity bits.

Provision is made in the system described in the the above-identified Budde, et al. application Ser. No. 296,025, for reporting (logging and signaling) of errors after detection. Once an identification is made of which bus or processor module (if any) is suspected to be faulty, deactivation of the bus (and rerouting of traffic around the bus) or deactivation of the processor module (and termination of process execution on that processor) can be carried out in accordance with the teachings of the present invention. System operation may commence once again, possibly in a degraded fashion (missing a bus or module).

ERROR REPORTING

Reporting mechanisms, including logs used to record information about the detected errors, are provided as described in the above-identified Budde, et al. application Ser. No. 296,025, and summarized in the following paragraphs. Included are error signals which interconnect units in a module and those which communicate error information throughout the interconnection matrix.

Immediately upon detecting an error, a message is broadcast to all the nodes (BIUs and MCUs) in the system. This error-report message identifies the faulty confinement area, the type of error which occurred, and whether the error is permanent or transient. There are two reasons for sending this error report. First, it informs the rest of the system that an error has occurred. This prevents other confinement areas from using the inconsistent data. Second, it provides the necessary information for system recovery. After recovery, the error message is recorded in a log register in the logger (138, FIG. 2) at every node in the system.

The error messages are broadcast over the set of MERL and BERL buses which are totally independent of the ACD and MACD buses used during normal operation. However, this network of MERL and BERL buses follows exactly the same topology as the ACD and MACD buses. A failure on one of these buses is limited to one of the confinement areas discussed earlier. The error-reporting circuitry may be tested during normal operation to uncover any latent faults.

REDUNDANCY

The system is provided with backup resources (processor modules, memory modules, and buses) for fault recovery. Backup resources are classified as either alternate resources or redundant resources. Alternate resources can be used for on-line reconfiguration if the resource does not hold any state information (for example, buses), or off-line reconfiguration for resources with state information (for example, GDP modules). Redundant resources are used for on-line reconfiguration of a resource with state information (GDP).

Redunant memory buses and processor and memory modules to support system reconfiguration are provided as described in the above-identified Budde, et al. application Ser. No. 296,025. Memory bus switching is supported by providing the MCU with the means to connect onto a second memory backup bus different from its nominal primary bus when an error condition exists. Thereafter, processor requests to the memory are placed not on the faulty bus, but on the backup bus to maintain memory accessibility.

Module shadowing, described in the above-identified Budde, et al. application Ser. No. 296,025, extends the basic FRC method described in the above-identified U.S. Pat. No. 4,176,258, of Daniel K. Jackson by providing extra redundancy to ensure that a module's operation is continuously checked via cycle-by-cycle comparison, even once a fault has been detected. (With simple FRC, detection of a fault typically implies loss of microsynchronization, with attendant loss of any further error-detecting capability). Once a malfunction does occur the coverage degrades to simple FRC, which is adequate to protect that part of the system during the time reconfiguration is carried out.

RECOVERY MECHANISMS

Recovery mechanisms are the specific hardware logic required at the BIU and MCU to allow the system to respond to error reports and to switch to backup buses or modules.

Whenever an error has been reported in the system, the recovery hardware, which is replicated at each BIU and MCU node, attempts to recover from the error. The recovery is accomplished without resort to any central hardware or software. All action takes place in hardware at each node. Recovery proceeds from the following information about the error:

1. The location at which the error was detected.
2. The type of error which was detected.
3. The redundant resources that are available in the system.

Figure 3:
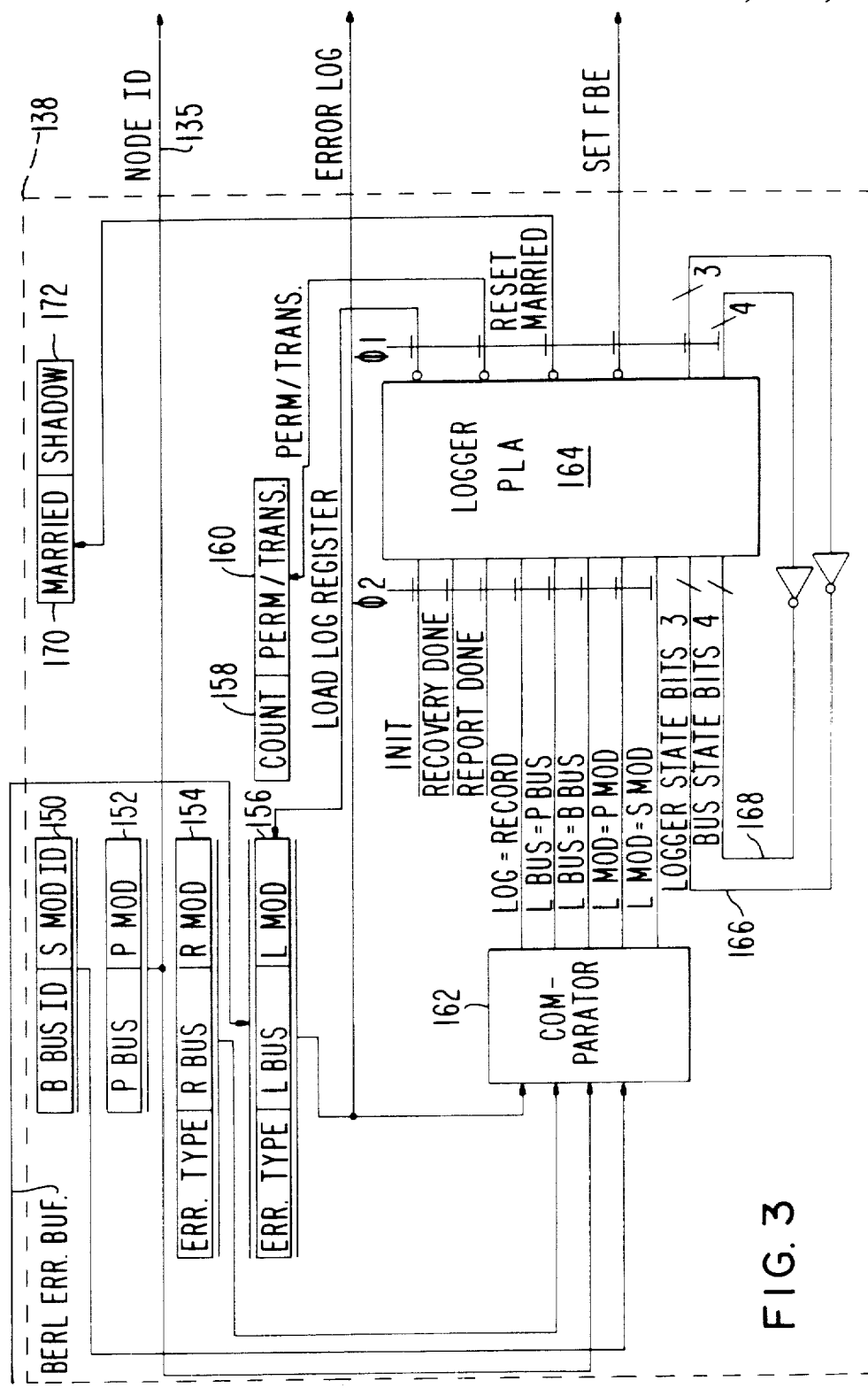
FIG. 3 is a detailed diagram of the logger (138) shown in FIG. 2.

This information is available at all the nodes in the system at the time of error occurrence via messages received at the node over the error-reporting matrix and the state information held in registers at each node (error-report log, its physical node ID, shadowing status, and backup-bus status, stored in registers in the logger, FIG. 3).

There are five redundancy mechanisms. Two of these mechanisms provide redundant information useful in recovering from transient errors, while the other three mechanisms allow recovery from permanent errors in the system. These redundant resources cover the entire system and allow recovery from any detected error.

For transient errors:

Each BIU maintains an internal buffer which allows outstanding processor requests to be retried if a transient error occurs.

A single bit correcting ECC code is applied to each word in the memory arrays. Although this provides redundancy for both permanent and transient errors, its primary purpose is to correct soft errors which occur in dynamic RAMs.

For permanent errors:

Every module in the system may be paired with another shadow module of the same type. This module pair operates in lock step and provides a complete and current backup for all of the state information in the module. This mechanism is known as module shadowing and is described in the above-identified Budde, et al. application Ser. No. 296,025.

Each memory bus in the system may be paired with another memory bus. During normal operation the buses run independently. Both contribute to the total bandwidth available in the system. However, if one bus fails the other bus is capable of handling the bus requests which normally would have been handled by the failed bus.

Inside of each memory module, a spare bit may be added to each word in the memory array. If one bit in the array fails, the spare bit can be switched in to replace the failed bit.

These mechanisms are also described in the above-identified Budde, et al. application Ser. No. 296,025. For transient errors, all of the outstanding accesses will be retried and the MCU nodes will return corrected data if there are any single bit errors in the memory arrays.

For permanent errors, the redundant resource (bus or module) is switched in to replace the failed unit. This switch is done on a node by node basis, there is no centralized element which controls the switch. Each node knows which module or memory bus it is backing up because it maintains the bus ID and module ID of the backup resources in a register (150), shown in FIG. 3. If the error report identifies the partner of a node as the faulty unit, then the node becomes active and takes over operation for the faulty unit. After the resource switch is complete, all of the outstanding accesses are retried. This allows operation to resume at a point before the failure corrupted data.

Figure 2:
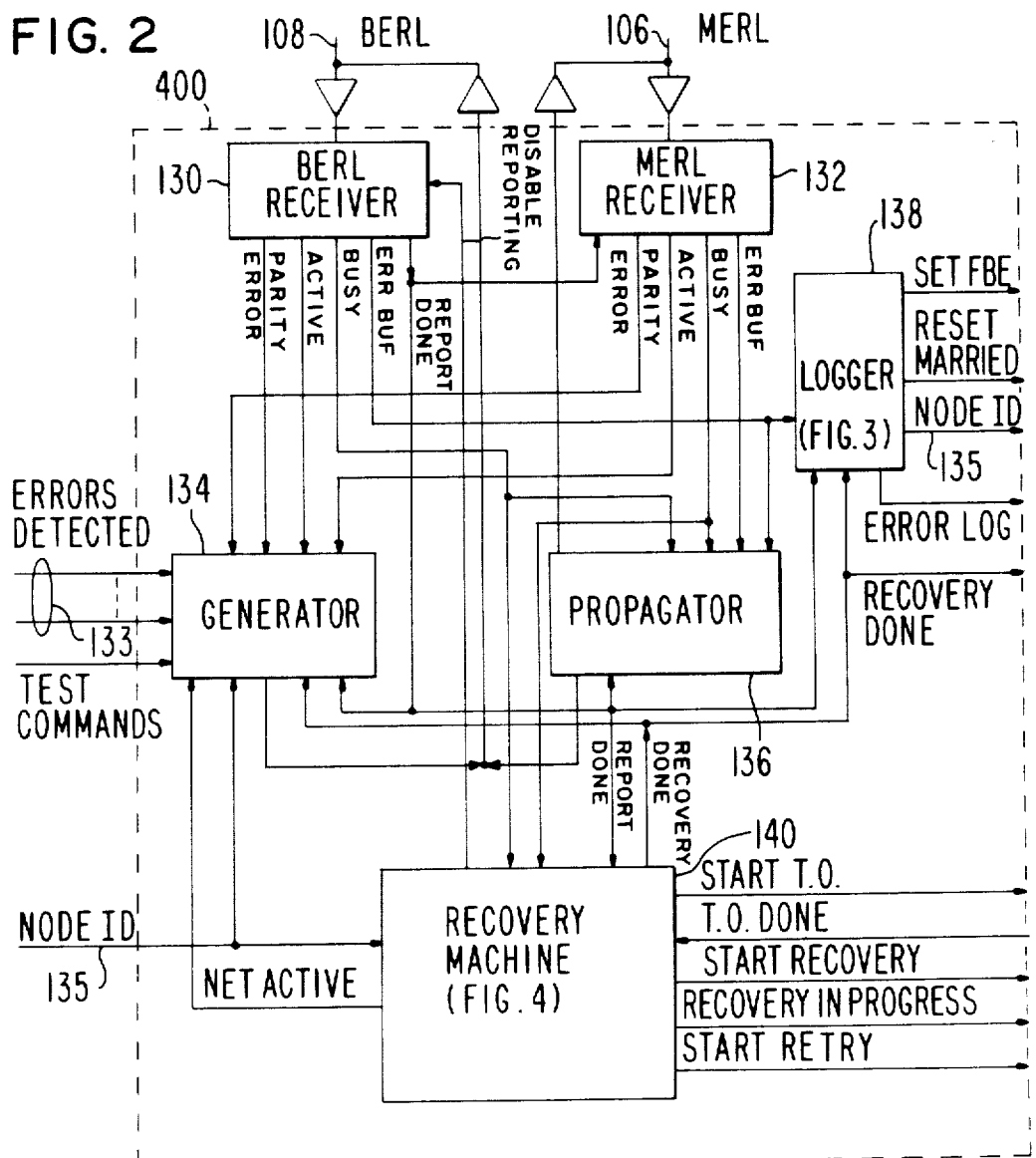
FIG. 2 is a detailed diagram of a fault-handling machine within the BIU and MCU nodes shown in FIG. 1.

Refer now to FIG. 3 which is a detailed diagram of the logger (138) shown in FIG. 2. The logger (138) is comprised of registers (150–160), a comparator (162) and a PLA state machine (164). The register (150) holds the backup bus ID and the spouse module ID information for the bus and module with which this node is paired. The register (152) holds the physical bus ID and the physical module ID information for this node. The log register (156) holds the error log information for the current error report loaded from the BERL error buffer in the BERL receiver (130) of FIG. 2. The record register (154) holds the error log information for the previous error report loaded from the log register (156). The comparator (162) utilizes the contents of the registers (150-156) to decode various permanent error conditions for this node or for the node which this node is backing up. The count field (158) maintains a count of the number of errors which have occurred. The perm/trans bit (160) indicates if the error is a permanent or a transient error and is set by the logger state machine (160). The married bit (170) is used to unify a primary and shadow pair. The shadow bit (172) specifies that this module is either a primary or a shadow when the married bit is set. It determines which module of the pair will handle the first access. Thereafter the modules will handle alternate accesses (ping-ponging) if the married bit is set. The logger state machine receives the Recovery Done input from the recovery machine (140) of FIG. 2 and the Report Done input from the BERL receiver (130) of FIG. 2. The logger state machine generates the Load Log Register signal which gates the error report from the BERL error buffer into the log register (156). The logger state machine generates the Reset Married signal which resets the married bit to activate a shadow module and make it a primary module. The logger state machine generates the Set FBE (force bad ECC) to lock a damaged resource. The logger state machine generates the Perm/Trans signal which sets the Perm/Trans bit to Permanent upon the occurrence of a permanent error. The logger state machine generates the three logger state bits (166) to sequence through the state diagram shown in FIG. 5. The logger state machine generates the four bus state bits (168) to sequence through the state diagram shown in FIG. 7. The four bus state bits (a, b, c, d) are defined as follows:

a: enable my primary address range.
b: enable my backup address range.
c: my backup bus has its primary address range enabled.
d: my backup bus has its backup address range enabled.

Figure 5:
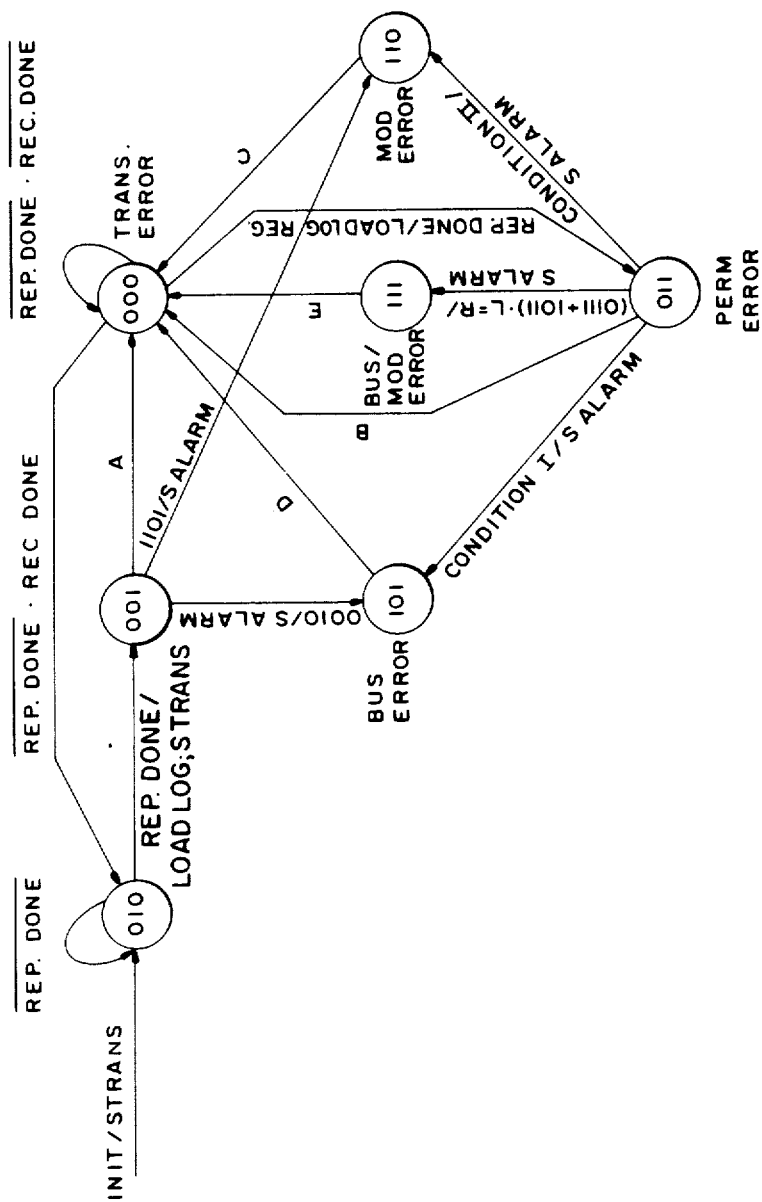
FIG. 5 is a state diagram of part of the logger PLA shown in FIG. 3.

Refer now to FIG. 5 which is a state diagram for the logger state portion of the logger PLA state machine (164) shown in FIG. 3. The four-bit binary number notations on the diagram refer to error-type codes in the error-report message. The abbreviations have the following meanings:

Condition-I: (1111) (Lbus=Rbus) (LT=RT)+(1000) (Lbus=Rbus) (LT=RT)+(1100) (Lbus=Rbus) (LT=RT).
Condition-II: (1110) (Lmod=Rmod) (LT=RT)+(1001) (Lmod=Rmod) (LT=RT)+(0110) (Lmod=Rmod) (LT=RT)+1101.
A: ELSE 0011/see interchange equations; 0010/see attach equations below.
B: ELSE 0011/see interchange equations; 0010/see attach equations below.
C: R married if (Lmod=Pmod)·(Enrecov); R married if (Lmod=Smod)·(Enrecov); S FBE if (Lmod=-Pmod)·(NOT Lbus=Pbus)·(Me)·(NOT Alone)·(Wr)(Enrecov)·(NOT Married).
D: Enables bus switching state machine.
E: Same as C and D above.

The logger states bits are as follows:

010 NORMAL—The machine waits for Report Done to be asserted by the BERL receiver (130). When this occurs, the machine loads the log register (156) with the contents of the BERL register (130) and sets the permanent/transient bit (160) to transient. The state moves to 001.

001 on first error occurence, the state moves to 000 TRANSIENT ERROR. If on the first error occurence reported, an unsafe module error is reported by an MCU, the state moves to 110 MODULE ERROR; a detach command will move it to state 101 BUS ERROR. For all other error types, retry is attempted. On the second report of the same error after retry, the state moves to 011. Path B indicates that the attach equations or the interchange equations are satisfied and the state returns to 000.

000 TRANSIENT ERROR—The machine stays in this state until the recovery done signal is generated without reporting done being asserted, that is recovery is completed without an error report, indicating a transient error, and the state returns to 010. If the recovery done signal is generated with reporting done asserted, that is recovery is completed with an error report, indicating a permanent error, the machine asserts the Load Log Register line and the state moves to 011 PERMANENT ERROR.

011 PERMANENT ERROR—In this state, all the different error conditions are decoded in comparator (162), and the machine moves to one of four states: state 101 if a bus error occurred, state 110 if a module error occurred, state 111 if a bus/module error occurred, or the machine returns to state 000 if the error does not require any recovery action by this node.

101 BUS ERROR—Path D indicates that the detach equations listed below are satisfied and the state returns to 000.

111 BUS/MODULE ERROR—Path E indicates that the equations of paths C and D listed above are satisfied and the state returns to state 000.

110 MODULE ERROR—Path C indicates that the married bit equations listed above are satisfied and the state returns to 000.

Figure 7:
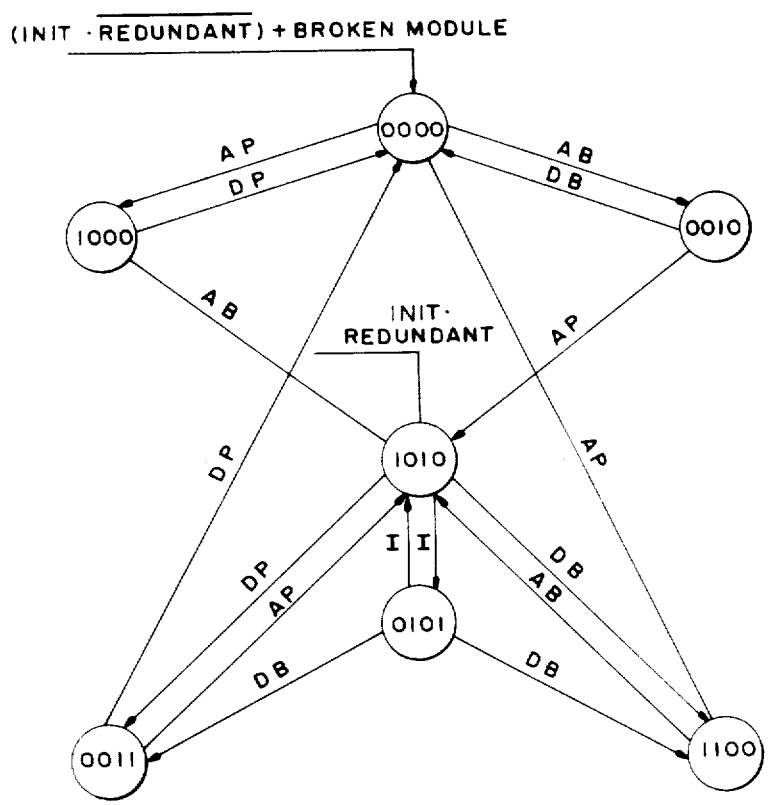
FIG. 7 is a state diagram of the rest of the logger PLA shown in FIG. 3.

Refer now to FIG. 7 which is a state diagram for the bus state porton of the logger PLA state machine (164) shown in FIG. 3. The abbreviations have the following meanings:

AP=Attach primary bus
AB=Attach backup bus
DP=Detach primary bus
DB=Detach backup bus
I=Interchange command The bus state bits (a, b, c, d) are as follows:

0000 NULL—Neither of the buses in this pair is active. This is the initialization state if the Redundant Bus Enable bit is off. No memory access can be performed in this state.

1000 PRIMARY UP—The bus to which this mode is attached is active. The second bus in the pair is not active. Memory access can be performed over the primary bus in this state.

0010 BACKUPUP—The bus to which this node is attached is not active. The second bus in the pair is active. Memory access can be performed over the backup bus in this state.

1010 NORMAL—Both buses in this pair are active. This is the initialization state if the Redundant Bus Enable bit is on. Memory access can be performed over both the primary and the backup bus in this state.

0101 INTERCHANGE—Both buses in this pair are active; however they are both using their backup address ranges. This is used to test that the bus recovery mechanism is working correctly. This is identical to the 1010 NORMAL state, except that the address ranges covered by the two buses have been interchanged.

1000 PRIMARY DOWN—The bus to which this node is attached is not working, and the backup bus has taken over the address range previously handled by this bus. This is the state of all nodes on a bus after the bus is reconfigured following a permanent errror.

0010 BACKUP DOWN—The other bus in this bus pair has failed. This bus has taken over the address range normally covered by both buses. This is the state of all nodes on a bus after its partner bus has failed.

Figure 4:
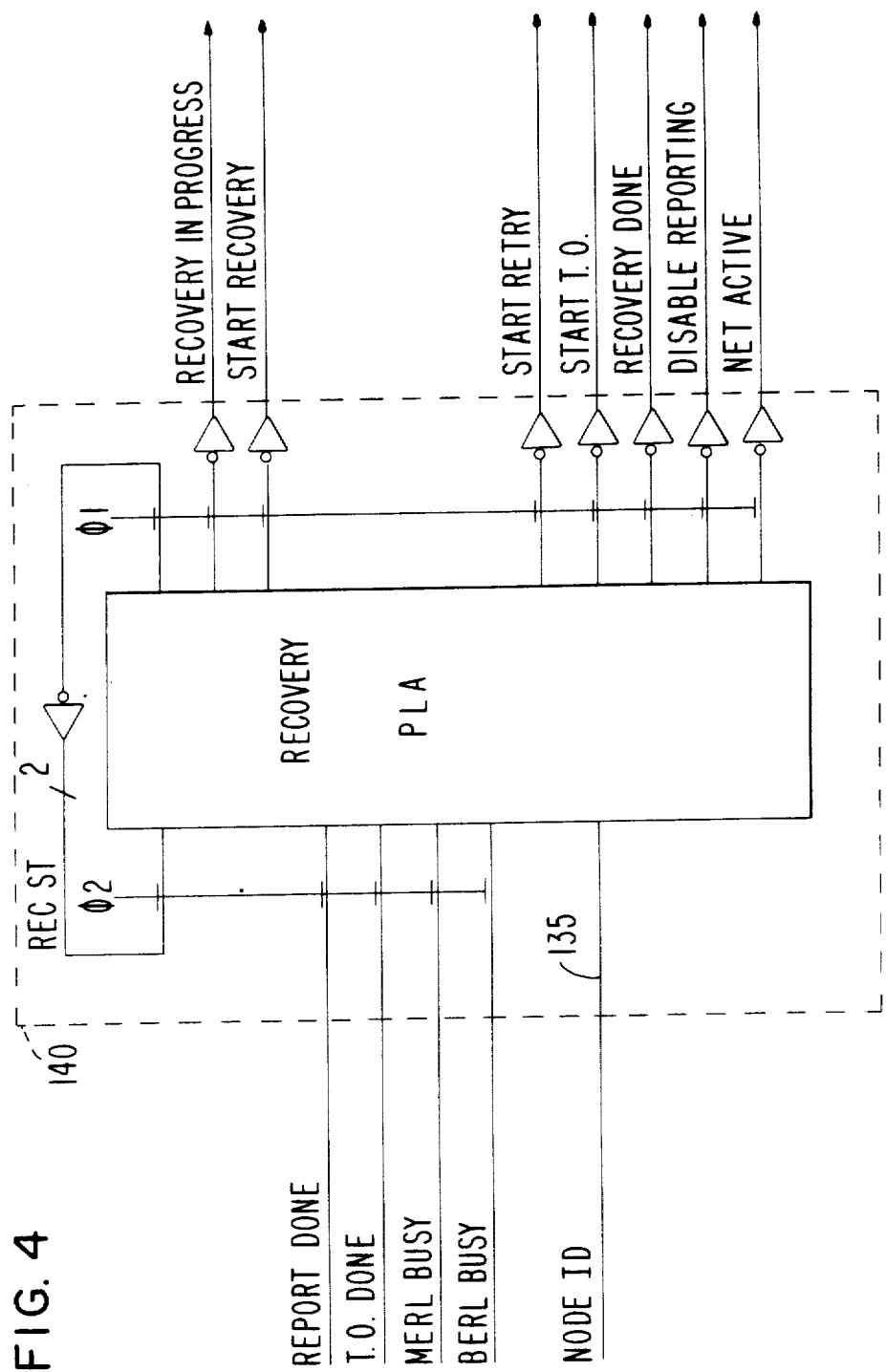
FIG. 4 is a detailed diagram of the recovery machine (140) shown in FIG. 2.

Refer now to FIG. 4, which is a detailed diagram of the recovery state machine (148) shown in FIG. 2. The recovery state machine receives the BERL Busy input (Berlerror) and the Report Done input (Repdone) from the BERL receiver (130) of FIG. 2. The recovery state machine receives the MERL Busy input (Merlerror) from the MERL receiver (132) of FIG. 2. The recovery state machine receives the T.O. Done input (Ftimeout) from a timeout counter (not shown) which it starts with the Start T.O. signal (Genrtim). The recovery state machine generates the Recovery In Progress signal (Enpipe), the Start Recovery signal (Disbus), the Start Retry signal (Oroerq), the Disable Reporting signal (Diserl), and the Net Active Signal (Netactive).

Figure 6:
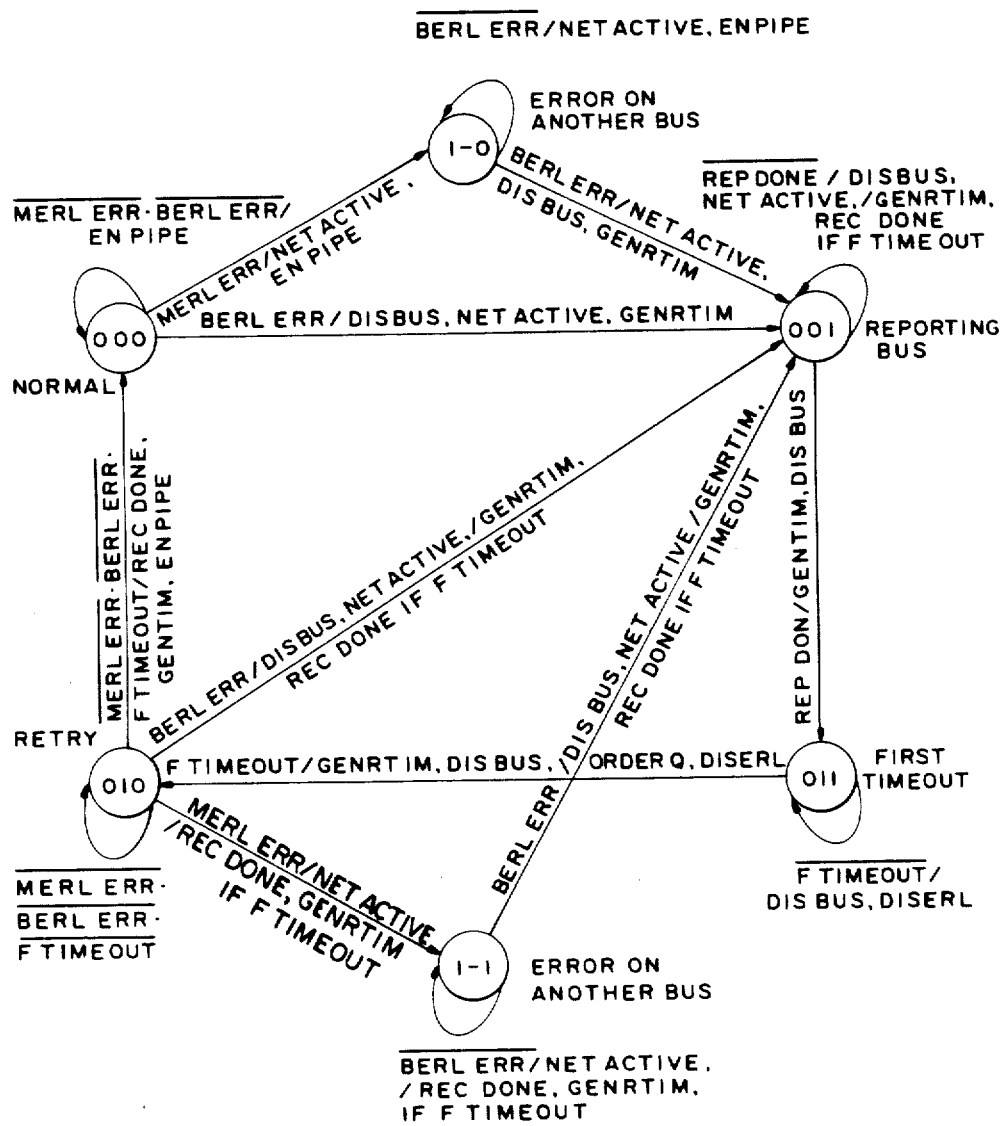
FIG. 6 is a state diagram of the recovery PLA shown in FIG. 4.

Refer now to FIG. 6, which is a state diagram for the bus switching portion of the recovery PLA state machine (140) shown in FIG. 4. The states are as follows:

000 NORMAL—The machine is in this state until a BERL error or a MERL error is reported, then the state moves to 001 REPORTING BUSY.

001 REPORTING BUSY—The machine is in this state until error-reporting is done, then the state moves to 011 FIRST TIMEOUT.

011 FIRST TIMEOUT—The machine waits in this state for the duration of the first timeout period to allow transients to subside. The line Disable Error Reporting is asserted to prevent an error-report message from being propagated. At the end of the first timeout period the machine proceeds to state 010.

010 RETRY—During this state all the accesses are retried. The machine stays in this state for the duration of the second timeout period to allow for detection of permanent errors. At the end of the second timeout period the machine issues the Recovery Done signal and proceeds to state 000 if no error is reported, or if an error reported but is not the same as the error previously reported. This indicates that an error is to be treated as a new error (see FIG. 5, state 000 TRANSIENT ERROR which returns to state 010). If at the end of the second timeout period an error is reported and compares the same as the error reported previously, the machine issues the Recovery Done signal and proceeds to state 001 to treat the error as a permanent error (see FIG. 5, state 000 which proceeds to state 011-PREMANENT ERROR).

Two extra states, 1-0 and 1-1 ERROR ON ANOTHER BUS, are provided to account for the fact that BIUs are attached to MERL lines whereas MCUs are not. This means that BIUs receive error information before MCUs. If BIUs went directly from the NORMAL state 000 to the REPORTING BUSY state 001 or directly from the RETRY state 010 to the REPORTING BUSY state 001, they would be out of sync with the MCUs. Hence BIUs go from the NORMAL state 000 to the state 1-0, and thence to the REPORTING BUSY state 001, and from the RETRY state 010 to the state 1-1, and thence to the REPORTING BUSY state 001.

RECOVERY PROCEDURES

Referring now to FIG. 2, the error-recovery sequence carried out by the recovery machine (140) begins when the nodes in the system receive an error report over BERL (108) or over MERL (106). This error message is logged in the logger (138) and the MERL or BERL busy line to the recovery machine (140) is activated. The recovery machine (140) activates the Start T.O. line to cause the system to become quiescent for a first timeout delay period, thus waiting for any transient noise to subside.

At the end of the transient waiting period, the recovery machine (140) activates the Start retry line to cause all of the accesses outstanding in the system to be retried during a second timeout retry delay period. If the same error recurs during the retry period, then the error is labeled a permanent error, and the logger machine sets the Perm/trans bit (160). Based on the location and error type information in the error message, the faulty resource is isolated from the system and redundant resources are activated to replace the failed unit. This reconfiguration is performed in an independent and distributed manner by the recovery machines (140) in all of the nodes in the system.

When the recovery operation has been completed the system software will be informed of the error and subsequent recovery actions. In the case of a permanent error, the BIUs send an interprocessor communication (IPC) message to all of the processors in the system. This informs the software of the critical system condition immediately. For transient errors, system software may be programmed to poll the error-report logs in the BIUs and MCUs. This completes the recovery sequence and the system resumes normal operation. The recovery procedures are located totally within the BIU and MCU. The same recovery procedure is used independent of the amount of error detection or redundancy available in the system.

Figure 8:
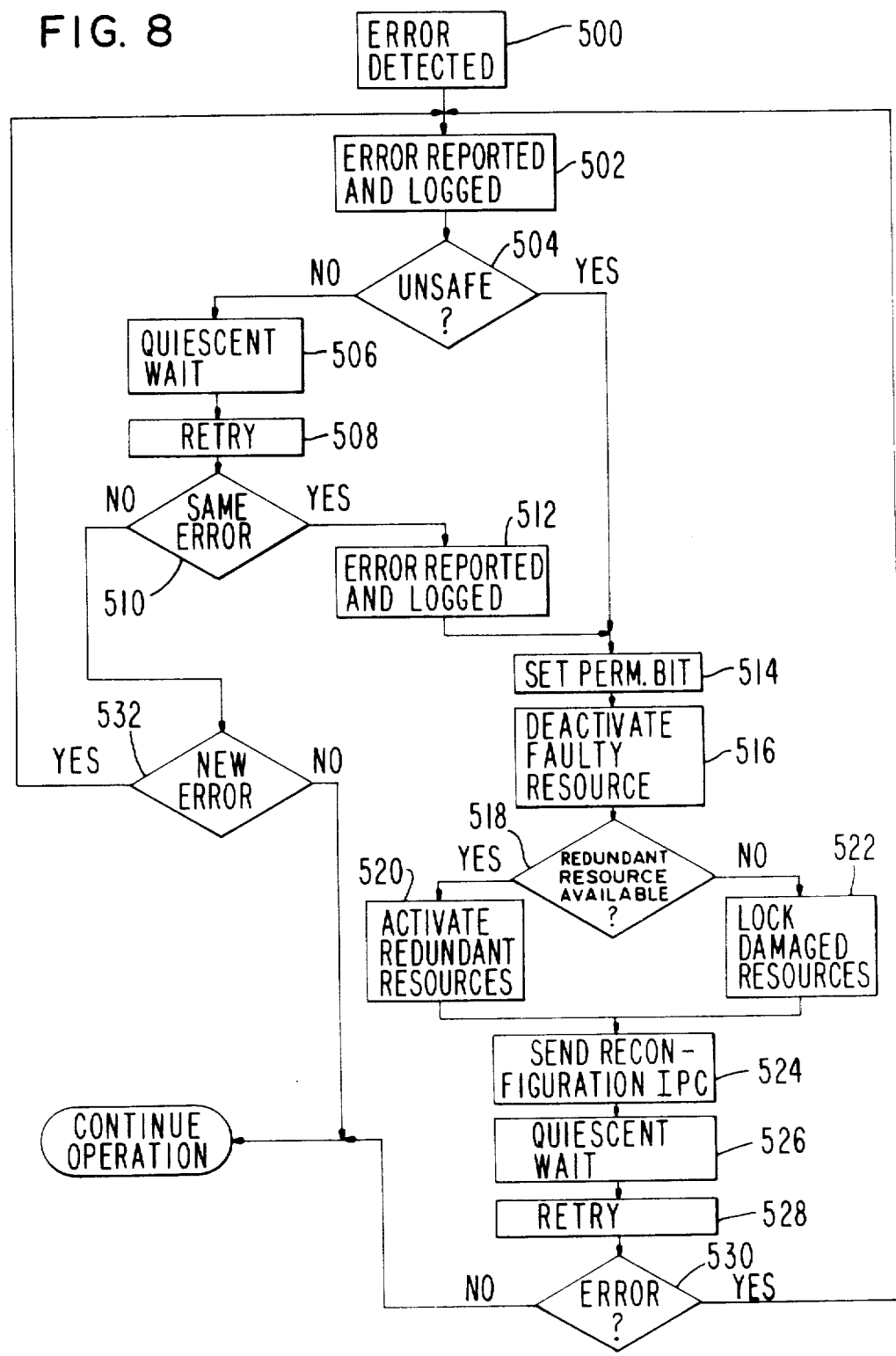
FIG. 8 is a detailed flow diagram of the recovery process.

FIG. 8 is a flow chart of the recovery procedure carried out by the hardware. This diagram identifies the steps in the recovery sequence described in detail in the following paragraphs. There is a section on:

The Unsafe Module decision (504).
The retry squence (508).
The permanent error decision (512-514).
Resource reconfiguration (516-522).
Communication with the system software (524-530).

The recovery operation takes place in parallel in all the BIUs and MCUs in the system. There is no global agent responsible for correct recovery actions. The recovery state machine (140) and the logger state machine (138) in each node performs its portion of the recovery sequence independently of all of the other nodes in the system. The mechanism synchronizing and connecting the recovery actions is error reporting. The error-reporting cycle ends with all nodes in unison, entering recovery in lock step.

The Unsafe Module Decision (504):

The recovery sequence is the same for all error types except unsafe module errors which are handled as permanent errors immediately. Unsafe module errors can only be reported by MCU nodes.

This error type corresponds to a class of errors which corrupts data in the memory array, but may not be detected if the access is retried. Because the error may not be detected if the access is retried, the faulty module must be immediately isolated from the system. For all other error types, retry (508) is the first step in the recovery sequence at the end of the waiting period (506).

The unsafe module decision is made simply by the recovery machine (140) reading the error type in the error-report log (138). If the error type is Unsafe Module (code=13), then the BIUs and MCUs will directly enter the reconfiguration sequence (516-522). In all other cases the nodes will begin the retry sequence (508) immediately.

The Retry Sequence (508):

The retry sequence is broken into two parts. First, there is a waiting period (506) during which time the machine is quiescent. This is followed by a time window (508) in which all pending acceses are retried and the nodes check (510) for the same error to recur. The recovery machines at all nodes in the system enter this phase of retry on the same clock cycle. (Certain conditions can cause the nodes to enter retry out of step. Their effect on retry is described subsequently.)

The quiescent waiting period (506) is defined by the Timeout Duration register in all of the nodes in the system. At initialization, the Timeout Duration register is set to the value zero. A value is then written into the registers in all the nodes. All nodes in the system must have been the same value in their Timeout Duration registers.

The quiescent period allows transients in the system to subside before the accesses are retried. During this time there is no activity over the Memory buses. Processors may generate new requests, but the BIUs will stretch the processor until the end of the waiting period. During the waiting period, refresh continues normally for the memory arrays. Errors are not reported during this time interval. The only type of error which will be latched, and reported later is an Unsafe Module error at an MCU node. All other error conditions will be ignored (if they affected the state of the module, they will be detected during the second phase of retry). The time interval is adjustable over a wide range to allow the waiting period to be tailored to the operating environment of the system. The delay is long enough to handle transients which are induced by mechanical stress as well as electrical interference.

The Permanent Error Decision (512-514):

At the end of the quiescent waiting period, all of the nodes enter the second phase of retry, the permanent error window. During this time interval all pending memory accesses are retried and the system is monitored for a permanent error condition. The recovery machine in the mode that detected the error prevents that node from retrying the access.

At the state of retry, the primary module of a redundant shadowed pair always becomes the active module. This approach is required to keep the primary and shadow modules in step in the presence of bus errors. Otherwise both modules might think they are passive.

The Timeout Duration register controls the length of the permanent-error window. The quiescent waiting period and the permanent-error window always use the same time interval.

Every access pending at the start of the permanent-error window will be retried. This includes those access which may have originated while the system was in the quiescent waiting period. During the quiescent period, all of the MACD bus arbitration state information is flushed out. There is no bus state left over from before the error occurred. All of the pending access requests are placed in one of two groups depending on access type.

The first group holds: Writes, RMW-writes, FBE commands, and RMW-read enqueue (if it is an MMA and the other half has been completed). All BIUs with an access in this group place their access request in the first time slot of the time ordering request queue (time slot 1 shown in FIG. 1 of the above identified Budde, et al. application Ser. No. 342,837).

The second group contains all of the read and RMW-read enqueue requests. All BIUs with an access request in this group place their request in the second time slot of the time ordering request queue (time slot 2 shown in FIG. 1 of the above identified Budde, et al. application Ser. No. 342,837). Priority arbitration will then provide a second level of arbitration just as is done during normal operation. This sequencing means that all accesses in the first group will be completed before any access in the second group is completed. This provides logical ordering for the whole system, but physically, this ordering is on a bus by bus basis, not system wide (just like normal arbitration ordering). Any request which arrives after the start of the permanent error window will be handled normally. None of these late-arrival requests will be completed until all of the retried requests have been completed.

Retry has the following characteristics. The ordering of requests during retry is likely to be different from the ordering of requests before the error. All writes will occur before reads. This guarantees that all of the read requests will return with consistent information. When the error occurred there may have been some half finished MMA accesses. This leaves the system in an inconsistent state. By issuing all writes before reads, the system is returned to a consistent state before any read access occurs.

The uncompleted half of a partially completed RMW-read operation will be enqueued before any other RMW-read enqueue operations. This is done to guarantee that deadlock will not occur between two RMW requests. (This could occur if 2 RMW MMA requests spanned the same location with one request locking the memory on one bus, and the other request locking the memory on the second bus.) This does not means there will be only one enqueue during the first time period, or that the RMW-read is guaranteed to be successful. It simply allows all requests which have locked another resource to have priority over those requests which have not been granted a lock. This prevents deadlock.

There will not be any Correctable ECC error reports generated during the permanent error window. During the permanent error window the MCUs check the ECC code before data is returned to the BIU. If a Correctable ECC error is detected, the MCU will correct the data before it is sent to the BIU. The error will be logged in that particular MCUs Array Error Log, but no error-report message will be generated.

The completed half of a partially completed RMW-read operation will be converted into a normal read access. Because the lock has already been set for the RMW operation, if a RMW-read was retried, it would never be granted because the location is locked and would never be unlocked.

The completed half of a partially completed RMW-write operation will be converted into a normal write access. This must be done to prevent clearing a lock which may have been set by another access.

Except for the special arbitration sequence for the retried accesses, operation during the permanent-error window is identical to normal operation. The difference is in the response to errors. The permanent-error window defines the only time period in which an error can be labeled a permanent error (except for Unsafe Module, which is always a permanent error). Because there is no guarantee that the same node will retry the access, it is important to have a reasonably long permanent error window. This prevents a permanent error from appearing as a string of transients.

Permanent errors are defined to be errors which occur twice in a row within a specified time interval. The time interval is defined by the permanent error window, the second timeout period. To be considered a permanent error, the second occurrence of an error-report message must have an identical Error Type field and the Node ID field must be a node in the same confinement area as the first error report. Thus Bus type errors must have the same Bus ID, Module type errors must have the same module ID, and Bus/Module type errors must have the same node ID (bus and module). It is not possible for a Correctable ECC error report to be labeled as a permanent error because correctable ECC errors are not reported during the permanent error window (the error is simply corrected by the MCU).

If an error is identified as a permanent error, then the Permanent Error bit (158) in the error-report log will be set (block 514, FIG. 8) and the BIUs and MCUs will enter the reconfiguration sequence of the recovery operation.

Resource Reconfiguration (516-522):

The term resource as used in this specification refers to a vertical module (processor or memory module) or a horizontal bus. Each error report identifies either a module, a bus, or one module and one bus as the areas where the fault occurred. Each node reads the node ID field in the error report and decides if it is in the faulty confinement area. The following paragraphs describe the deactivation of each of the four types of confinement areas which are described with respect to FIGS. 2-5 in the above-identified Budde, et al. application Ser. No. 296,025.

(1) and (2). GDP or IP module. A processor module is deactivated when all of its BIUs:

Disable primary and backup memory address ranges. This is done using the four bus state bits (A, B, C, D, defined above) in the state register (164 FIG. 3). These bits are all reset to zero.

Disable local register accesses. This is done by clearing the Enable Local bit in the state register.

Ignore the MERL line. The MERL receiver is disabled in each BIU.

In this state the module is totally deactivated. No requests of any type may be generated by this module. The BIUs will still reply to local register and IPC requests which are issued from other processors. The error detection circuits at the MACD interface remain enabled and if an error is detected it will be reported. All errors will have the BUS/MODULE error type.

(3) Memory Module. A memory module is disabled when the MCU disables its memory address range. This is done by clearing the Memory-On bit in the state register. The MCU will still respond to local register requests. All of the error detection circuits, except Buffer Check, remain enabled. All errors will have the BUS/MODULE error type. The MCU will remain attached to the same MACD bus.

(4) Memory (MACD) Bus. A memory bus is disabled when all of the BIUs attached to the bus disable their memory address range. This is done by clearing the Enable Primary and Enable Backup bits in the state register. Local register accesses may still use the bus.

The action of MCUs depends on the availability of a backup bus. If possible the MCU will switch to the redundant bus, otherwise the MCU will clear all four of the bus state bits. Error report generation and MERL propagation are turned off in all of the BIUs on this bus.

These actions isolate the faulty confinement area from the rest of the system. If any of the BIUs or MCUs does not correctly deactivate, it will be physically isolated from the system by deactivating the other confinement area (Bus or Module) which this node touches. This occurs because the error report will be of type Bus/Module, or another BIU in this module may generate a module error after a bus has been deactivated. Now the failed component is totally isolated from the system by a set of known good nodes. At this point the Bus and the Module attached to this node have been deactivated.

After the faulty confinement area has been isolated from the system, then either the backup resources are activated, or if no redundant resources are available, any damaged resources are locked. Reconfiguration, like all the other aspects of recovery, is done independently by each BIU and MCU. There is no central unit or software responsible for reconfiguring the system. All reconfiguration actions take place during the first few cycles of the quiescent waiting period.

Each BIU and MCU reads its error-report log and decides if it is part of the redundant confinement area which should be activated (510) to recover from the error.

GDP, IP, or Memory Module Confinement Area:

If the Module ID in the error report matches the Spouse ID in this node and the Married bit in the state register is true, then this module is the redundant resource and should be activated. The only action required to activate a module is to clear its Married bit. This will cause the module to be active on every access, rather than alternating accesses with its spouse. Thus the redundant module will mask the permanent failure in the spouse module.

Memory Bus Confinement Area:

If the Bus ID in the error report matches the Bus ID of this node's backup bus and either Enable Primary or Enable Backup is set and either the memory buses are 4-way interleaved or their is a redundant bus, then this bus is the redundant resource and should activate its backup address range. The bus is activated to cover the full address range by setting both the Enable Primary and Enable Backup bits in the State register. MCUs which were attached to the faulty bus must switch to the backup bus. If the MCU's Bus ID matches the Bus ID in the error report and the bus state bits indicate that the backup bus is available, then the MCU will toggle BUSSEL (defined in the above-identified Budde, et al. application Ser. No. 336,866), which will cause the MCU to attach to its backup bus. All MCUs have moved to the working bus in the bus pair, and the BIUs are recognizing the address range which used to be covered by two buses. Thus the backup bus will mask the permanent failure on its partner bus. FIG. 7 describes the state machine which controls the bus state bits during memory bus reconfiguration.

Lock Damaged Resources (522):

If there aren't any redundant resources available, then the system must lock any resources which may have been damaged as a side effect of the error condition. The confinement areas which were faulty have already been removed from the system, at block 516 of FIG. 8. The only resource which may be damaged is a memory module corrupted by a partially completed MMA access. If an error occurs during an MMA write operation, one of the memory modules may hold new data while the other memory module holds old data. Thus this logical memory structure holds inconsistent and therefore corrupt data. This corrupt memory structure is locked to prevent access by other modules.

At this point reconfiguration is complete. The faulty confinement areas have been isolated from the system. If redundant resources were available they have been activated to mask the effects of the failure. If redundant resources were not available, any memory location which may have been damaged by a partially completed MMA write access is locked.

Communication with the System Software (524–530):

If the failure was a transient error, then communication with the system software is only done via the error-report logs. These logs may be periodically polled as part of the general housekeeping services provided by software.

Send Reconfiguration IPC (Block 524):

If the failure was a permanent one, it requires immediate attention to minimize the system's exposure to errors while it is vulnerable to failure (e.g., at least one resource in the system no longer has a redundant backup resource). This action is achieved by an Interprocessor Communication (IPC) message automatically generated by the BIUs on the ACD buses (block 524, FIG. 8). Interprocessor Communication (IPC) is described in the above-identified Colley, et al. application Ser. No. 971,661. Thus, any time an error condition is labeled a permanent error, all of the processors in the system will receive a Reconfiguration IPC message.

In response to the Reconfiguration IPC, the GDPs should suspend their current process as soon as possible and then dispatch themselves from a Reconfiguration Dispatching port. Dispatching ports are also described in the above-identified Colley, et al. application Ser. No. 971,661. At this port the software system will have placed a process which is designed to activate other processes which can make management decisions about the best mode of operation for the system.

When an IP receives a reconfiguration IPC it will send an interrupt to its AP. In this way the system software is immediately informed of the vulnerable state of the system and can react quickly to degrade the system in the manner most optimal for the application.

Quiesent Wait (block 526):

A timeout period is provided to give the reconfigured system time to settle down.

Retry (Block 528):

At the end of the timeout period the accesses are retried, with the reconfigured resources in place.

Error Detected on Retry (block 530):

An error detected during the retry (block 530) will be reported and logged at block (502) and will be treated as a new error. The recovery sequence will then be carried out from the beginning.

INTERPROCESSOR COMMUNICATION (IPC)

Interprocessor Communication (IPC) messages are handled in a special way by the BIUs. Logically, all IPCs use bus 0 (107). A BIU on bus 0 is responsible for informing a processor attached to the ACD bus about any IPC messages pending for that processor. This information must be duplicated to allow for recovery from bus 0 failures.

Bus 2 (117) is the backup bus for bus 0, thus all IPC messages are sent over both bus 0 and bus 2. Because two buses are used for the message transmission, IPCs are treated like multimode (MMA) accesses. This guarantees that the information in the IPC registers on both buses remains consistent. While both BIUs participate on the memory bus side of the IPC message, only one of the BIUs actually responds to the request on the processor bus. When the processor reads its IPC register, the BIU on bus 0 responds if its primary address range is enabled, while the BIU on bus 2 responds if its backup address range is enabled. During normal operation the BIU on bus 0 will return data on IPC requests. The operation of the BIU on bus 2 can be checked by doing an Interchange Command, which will then cause the BIU on bus 2 to return data on IPC requests. The BIU which does not respond on the processor bus, updates its IPC register to maintain an accurate copy of the state of IPC messages.

Both IPC read and write use the memory bus and are handled as MMA accesses over bus 0 and bus 2. This approach utilizes the bus arbitration protocol to guarantee that the IPC information is always consistent. Example: An IPC read following behind an IPC write, will return the same data from both IPC registers because the read can not complete until the write has completed. The order of access will be the same on both buses.

MULTIMODULE ACCESS (MMA)

Multimodule accesses (MMA) are those accesses which span two memory buses. Because the two buses operate independently, the access may be in different states on each bus when an error occurs. This requires special consideration during recovery. There are two cases of interest: Read-Modify-Write (Read) requests and Write requests. The RMW requests were described previously.

Write requests may leave the memory data in an inconsistent state (part old data, part new data). This failure can only occur if a BIU fails before completing its write request, but after the other half of the MMA has been completed. If the error is permanent and there isn't a shadow module, then there is no way to correct the inconsistent data structure in the memory. A failure in the MCU or the memory array can never cause this problem. If the failure is in the memory module, no other processor will be allowed to access the memory array.

By monitoring the MMAL and MMAH signals on the processor bus, the BIUs can track the progress of the MMA operation on the other bus. If this error situation occurs (Perm module error, my module, not married, MMA write, my half complete), the BIU which completed its part of the MMA write access must lock the memory location on its bus. This is done by issuing a Force Bad ECC (FBE) request on the memory bus. This request will cause the MCU to write a special ECC code into the addressed location (ECC code of all ones). Any requests to this location will be rejected because the special FBE ECC code is interpreted as an uncorrectable error. This will prevent any further accesses to the corrupt location.

It is important to realize that only one of the two locations involved in the original MMA access received a FBE command. The other location may be accessed without any problems. This does not cause any logical inconsistencies. The only inconsistency occurs when a processor tries to access both locations as a single unit. To prevent that, one of the locations was forced to have a bad ECC code.

ACTIVATION OF SPARE RESOURCES

The concept of shadowed self-checking modules allows a number of spare strategies to be used in a system. Spare resources are activated on line using the procedures outlined for module shadowing start up in the above-identified Budde, et al. application Ser. No. 296,025.

SOFTWARE INTERFACE SUMMARY

Registers

This section provides a general review of all the registers in a node which play a role in the communication between software and the hardware fault-handling mechanisms. For each register there is a general summary of its function, its state after initialization, and any access restrictions.

Diagnostic Register (MCU and BIU):

This register holds a set of bits which enable many of the optional capabilities in the MCU and BIU components. The register also contains a few bits (M/C Toggle, Bad Access) which are used during normal operation. This register is initially set to zero which enables all of the detection and reporting mechanisms. There are no restrictions on access to this register.

The specific bit definitions found in both BIU and MCU are listed below.

Disable MACD Bus Parity Detection—Self-explanatory.

Disable Recovery—The purpose of this bit is to allow a diagnostic to to be able to run without dying due to some type of fault but still allow error reporting and logging. This may be used with some sort of software loop to allow scoping or logic analysis. This bit disables any type of bus switching due to error report or local command except for Bus Interchange. Additionally, the ALARM bit in the BIU's IPC register can not be set if Recovery is disabled.

Disable Error Report—This bit prevents a node from reporting errors on the error-report lines. It does not however prevent the node from logging its own errors. This is useful for isolating a bus from the rest of the system such that diagnostic software can evaluate the bus without subsequent errors effecting the rest of the system. In should be noted that errors reported on the error-report lines will be responded to normally.

Bits found only in the MCU:

Disable Scrubbing ECC Error Report—This bit disables loading the Array Error Log or Error Report Log or Reporting with scrub ECC errors. This bit allows other ECC errors to be logged by preventing the log to be filled because of a hard bit failure continually caught by scrub. Note however that the normal array log status bits will prevent scrub errors from being reported if the array log is already full.

Disable ECC Error Reporting—This bit disables the reporting of either correctable or uncorrectable ECC errors.

Disable MACD Bus FRC Detection—Self-explanatory. It is noteworthy here that MACD FRC errors are reported as Module errors while SLAD FRC errors are reported as Unsafe Module errors.

Disable SLAD Bus FRC Detection—Self explanatory.

Disable ECC Access Correction—In a read access, this bit disables the data correction when an access is staged. It does not affect error detection or reporting. This will allow the actual data to be read by diagnostic software. It must be noted that ECC error detection may need to be disabled also in order that the BIU will not respond to the error report. In a write access since writes are of a read/modify/write format to the array, this bit will prevent the read data from being corrected before the data is written back to the array. Note that this could allow undetected data corruption to the array if the read data had acorrectable or uncorrectable error since a new ECC code will be generated which matches the word written back to the array.

Enable Scrubbing—This bit enables data correction during refresh cycles.

Disable Refresh—This bit totally inhibits refresh cycles from occuring. This is useful for certain types of array testing.

Continuous Refresh—This bit will continuously cause refresh requests to be made to the internal array state machine. This interrupt request, unlike the Refresh Interval Timeout, has lower request priority than an access request or a local access request.

Enable Bus State Writability—This bit enables the bus state bits in the state register to be written to. This special enable is provided to safe guard against inadvertently modifying the bus state bits when writing to the state register since these bit control the BUSSEL pin on the MCU.

Bits Found Only in the BIU:

Diagnostics Mode—This bit disables the returning of Bus Error back to the processor due to a bus timeout for non-N-Local accesses. This allows the diagnostic evaluation of a bus and associated address ranges.

Bad Access Bit—During local accesses a permanent module error or a permanent bus error will set this bit. If the bad access flag is set all N-local accesses which are not MY-BIU accesses will be ignored and garbage will be returned to the processor.

Error-Report Log (MCU and BIU)

This register holds the information from the most recent error report. Only the count and permanent bit fields are cleared at initialization. Thus after a crash it may hold information relevant to understanding the cause of the crash. If the node is FRCd, this register should not be read until at least one Interchange command has been sent. The interchange command is required to set all of the count fields to a known value.

Interconnect Device ID (MCU and BIU)

This register is really only of interest in MCUs. The Bus ID resides here. If software wants to move a MCU it toggles the middle bit of the Bus ID by sending a Toggle command to the MCU it wishes to move. This register is a read-only register.

Interconnect Device Type (MCU and BIU)

Three bits in this register are of interest to the fault-handling mechanisms: Redundant Bus enable, Bufcheck enable, and Fault Tolerant specification. The first two bits are loaded during hardware initialization. The fault tolerant specification bit is hardwired on the component. If this bit is a 1, then the component is only capable of carrying out a subset of the fault-handling functions. This register is read-only.

Spouse ID (MCU and BIU)

This register holds the physical ID of the module which is married to this module. This register is used in setting up a primary/shadow pair of modules. In processor modules, this register must not be written to while the module is married. Reading the register will not always yield the same value since the primary and shadow have different values in the register. The register is initialized to the value zero.

State Register (MCU and BIU)

This register holds all of the relevant state information about the module and bus to which this node is attached. This information may be altered by the hardware as a result of recovery operations. In processor modules, the primary and shadow modules will have different values for the Shadow bit. Software must not write to this register during normal operation.

This register must be treated as read only as long as this module is active in the system. Before activating a module, the software must double check that the bits in the state register are all consistent with the system state (ie that software did not overwrite a hardware update). The specific bit definitions are listed below.

Married—This bit is used to unify a Primary and Shadow pair.

Shadow—This bit specifies if the module will become a primary or a Shadow when the Married bit is set. The designation of Primary vs Shadow serves only to determine which of the married pair will participate in the first access when Ping-Ponging is initiated by the setting of the married bit.

Master/Checker Toggle—This bit is used typically by maintenance software to swap master and checker to evaluate error-report line connections and other register information to verify the correct operation of the checker. If this bit is zero then the master/checker state is what was set at INIT time. If it is a one then the master/checker state is opposite the INIT time setting.

Bus State Bits—There bits specify the state of the Primary bus and the Backup bus if one exists. Both MCUs and BIUs have a set of these bits as they must both track their Primary and Backup buses the same when bus switching functions operate.

Bits found only in the MCU:

4-WAY—Four Way Bus Interleave Mode—This bit is used by the MCU to track BIUs in a system during bus switching. It specifies whether address mapping in the system is functioning with four way interleaving on bits 6 and 7.

Force Staging Always—When set to 1 this bit causes all read accesses to be staged and read data to be corrected if there is a correctable error. When set to 0 this bit will cause read data to be returned uncorrected and unstaged but errors reported. If an error occurs and retry is enabled in the system, then during the retry period read data will be staged and corrected independently of this bit.

If this bit is set and if the array error log is full, no correctable ECC errors will be reported.

Warm Start Init Occurred—This bit denotes if the last INIT pulse was a warm INIT as specified by the state of the MACD 11 pin during INIT. A warm INIT will not change the state of the Refresh Address Register, Refresh Timer Register or the Spare Bit Select Register as would a normal cold INIT.

Bit found only in the BIU:

Disable Retry—This bit disables the retry mechanism after an error report. All accesses that are outstanding after the start of an error report will always be retried if retry is enabled. If this bit is set accesses that would normally require a retry will possibly return corrupted data. Disabling retry could be used by a diagnostic program to analyze the actual corrupted data or garbage that was received. Disabling of retry could also allow the processor to run faster since reply data will not have to be staged in the BIU.

Timeout Duration Register (MCU and BIU):

This register controls the length of three timeouts: the memory bus protocol timeout, the quiescent waiting period, and the permanent error window. All three are always the same length. The length of the timeout can range from approximately 16 usecs to 2 secs. The exact formula for the time delay is: (Timeout Duration * $2^{\wedge}16$)+128) * system clock period. The timeout Duration register is eight bits long (0–255). The register is initialized to zero, which provides the shortest timeout (16 usecs).

Array Low/High Order Address (MCU only):

These registers provide the address used by local commands which access the memory array. These commands are used in testing the operation of the MCU. At initialization the Low register gets the contents of the MACD bus. There are 12 bits which are not defined by the hardware and may be used by the system designer to convey information to initialization software. The High register is initialized to zero.

Array Error Log Low/High (MCU only):

These registers hold information about ECC errors which this MCU has detected. These registers are initialized to zero.

Spare Bit Select (MCU only):

This register controls the spare bit multiplexing in the MCU. Values between 1 and 39 provide for the replacement of an array bit by the spare bit. All other values have no affect on the array operation. The register is initialized to all ones.

Logical ID (BIU only):

This register holds the ID which will always be used during arbitration. The logical ID replaces the module ID for local register accesses when a processor module is married. The value in this register must be unique in the system. All of the BIUs in one module must have the same logical ID. At initialization, this register is loaded with a reverse image of the module ID (MSB of mod ID is the LSB of logical ID, LSB of mod ID is the MSB of logical ID, etc). This provides a good arbitration distribution in sequentially numbered modules.

Test Detection Data Register (BIU only):

This register is used to provide the read data during Test Detection commands. This register may be used as a general purpose scratch register by software. At initialization this register gets the contents of the MACD bus. There are 12 bits which are not defined by the hardware and may be used by the system designer to convey information to initialization software.

Working/Merl (BIU only):

This register is used to monitor the operation of the processor and the module's MERL line. This register is initially set to zero.

COMMANDS

Commands use the local register address space. Instead of accessing a register, they cause a function to occur within the MCU or BIU. Commands still have a read or write specification. All commands which generate error reports cause the full recovery sequence, described previously, to be invoked, just like a true error. The commands which generate error reports are acknowledged before the error report and thus they will not be retried.

Attach [write]—(MCU and BIU):

This command allows a deallocated bus to be put back into operation on line. The command is sent to any node on the backup bus. (This is the bus which is currently handling the address range which will be taken over by the newly attached bus.) This command generates an error-report message with error-type ATTACH.

Bus Interchange [Write] (MCU and BIU):

This command interchanges the address ranges of all the bus pairs in the system. It also resets the count field in the error logs, and sets the permanent bit. This command is used to test the operation of the backup address recognition and bus switching logic. The command is sent to any node in the system. If a bus is not paired, then no bus switching will occur. This command generates an error-report message with error-type INTERCHANGE.

Detach [Write] (MCU and BIU):

This command allows a bus to be deallocated from the system while the system is on line. The command is sent to any node on the bus which is to be deallocated. This command generates an error-report message with error-type DETACH.

Test Detection [read] (MCU and BIU):

This command tests all of the detection mechanisms in the addressed node. All detection mechanisms are tested independently of the state of the detection enables. This command generates an error-report message. If there is a failure in the detection mechanisms, then the report will have a MODULE error type. If there aren't any failures, then the error type will be NO ERROR.

Test Report [Write] (MCU and BIU):

This command is used to test a specific component's ability to generate error-report messages. The data field in the command specifies which component will respond to the command. (0—Primary/Checker, 1—Primary/Master, 2—Shadow/Checker, 3—Shadow/-Master) Only values 0 and 1 are valid on the MCU. This command generates an error-report message with error-type TEST REPORT.

Access Data Low/High [Read/Write] (MCU):

These two commands are provided to allow software direct access to the 32 data bits in the array. The location accessed is determined by the Low/High order array address registers. This command allows direct reading of the data bits without any ECC correction.

Access ECC Bits [Read/Write] (MCU):

This command is provided to allow software direct access to the ECC bits in the array. The location accessed is determined by the Low/High order array address registers. This command allows direct access to the ECC bits in the memory array. This command will be used for memory testing and diagnostics.

Clear Location [Write] (MCU):

This command allows a location with bad ECC to be initialized to a zero data value with good ECC. The location accessed is determined by the Low/High order array address registers.

Clear Memory [Write] (MCU):

This command is identical to Clear Location, except it clears the entire array. A reply is sent before the MCU has completed the command. The MCU will remain busy until it has completed this command.

Toggle Primary and Backup Bus ID [Write] (MCU):

This command is used to assign a memory module to its alternate bus. This is different than a bus switch. The MCU will identify the new bus as its primary bus. This is useful during initialization or during software recovery from a permanent error. This command generates an error-report message with an error type of NO ERROR. An error report is issued to allow the MCU to become synchronized with the arbitration on its new bus.

Clear PU [Write] (BIU):

This command is used to synchronize the processor (GDP or IP) components when two modules are being married. This operation is required because the processors have a two-cycle idle loop. Thus, idle processors are not guaranteed to be in lock step.

SUMMARY OF SYSTEM OPERATION

This summary provides an example of the sequence of operation of a fault tolerant system employing the teachings of the present invention.

1. The system is powered up and the components are placed in a consistent state with each BIU and MCU having been assigned a unique local address (node ID).

2. The initialization software running on a GDP sizes the system, runs confidence tests on all of the resources in the system, and reviews the past error history in the system health log. The software decides which resources are available for use in the system configuration.

3. Based on the needs of the application and the available resources in the system, software running on a GDP decides on the optimal system configuration. Address ranges are assigned, modules are married, and buses are enabled with the correct redundant information. Timeout values are loaded into the timeout duration registers, and any of the optional fault tolerant capabilities are set to their desired state. The memory is loaded with the information required to run the basic operating system. The system is now ready for logical operation and is in a fully fault tolerant state.

4. The system is passed to the operating system and normal operation begins.

5. During normal operation a background task is run on a GDP which is constantly checking for latent errors in the system. This software uses the various commands to the BIU and MCU to verify the correct operation of the detection and recovery mechanisms. This software also polls the error-report logs to check on any transient error conditions which may have been reported. Infrequently used operations in the processors may also be tested during this time.

6. When an error occurs, it is detected by a hardware error detector.

7. An error-report message is propagated first by the node at which the error was first received, and then propagated along the MERL and BERL lines by other nodes so that the error report is broadcast throughout the system. This error-report message identifies the type of error and the location at which the error was detected.

8. The recovery machine in each node causes that node, and hence the entire system, to become quiescent and wait for any transient to subside.

9. All accesses which are outstanding in the system are retried. If the error does not recur, then normal operation will resume. If the error recurs, then the recovery operation proceeds to the next stage.

10. When the error recurs, an error-report message is again broadcast throughout the system.

11. The system becomes quiescent again and waits for any transients to subside. During this recovery time period the recovery machine in each node will take whatever recovery action is appropriate based on the type and location of the error. The faulty resource is isolated from the system and redundant resources are activated automatically by the recovery machine hardware.

12. All accesses which are outstanding in the system are again retried. Each processor in the system receives a Reconfiguration IPC from the BIU on the ACD bus attached to that processor. This sends an interrupt to each AP and will cause each GDP to suspend its current process at the earliest possible time. The GDPs will then go to their reconfiguration dispatching port.

13. A process waiting at the reconfiguration dispatching port(s) sends a message to higher software authorities notifying them of the system reconfiguration. This process may do some basic housecleaning, but it will almost immediately send the processors back to their normal dispatching ports.

14. The system is now running normally, but perhaps not in the most efficient configuration. Management software may make some decisions about the optimal configuration of the system: should resources be deallocated, should a spare be activated, etc. Once these decisions are made, the software may alter the active configuration to put the system in its optimal state for continued operation. Normal operation may need to be suspended for a brief moment if a spare memory module is brought on line.

15. The system returns to normal operation.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. In a data processing system including, a number of bus interface unit (BIU) nodes and memory control unit (MCU) nodes and in which a switching matrix provides electrical interconnections between horizontal MACD buses and vertical ACD buses connected in said matrix by means of said BIU nodes located at the intersections of said MACD and ACD busses, said memory control unit (MCU) nodes connected to said MACD busses,
   means for detecting an error,
   an error-reporting matrix including horizontal Bus Error Report Lines (BERLs) and vertical Module Error Report Lines (MERLs),
   said BERLs being associated with said MACD buses such that all BIU and MCU nodes sharing an MACD bus are connected with a pair of BERLs,
   said MERLs being associated with said ACD buses such that all nodes sharing an ACD bus are connected with a MERL, and,
   error-reporting means in a particular node connected to said means for detecting an error,
   said error-reporting means including means for receiving error messages transmitted over at least said one BERL, and means for reporting error messages over at least said one BERL, said error messages identifying the type of error and the locations (ID) at which the error was detected, a recovery mechanism in said particular node comprising:
   a recovery machine;
   said recovery machine including first means for causing said particular node to become quiescent for a first timeout period to thereby wait for transients to subside, said first means including means for disabling the reporting of errors by said error-reporting means for the duration of said first timeout period;
   said recovery machine including second means for causing said particular node to enter a second timeout period;
   means for storing memory accesses;
   means for generating memory accesses;
   means connected to said second means, operative during said second timeout period, for retrying a memory access stored in said storing means;
   permanent error determining means connected to said means for detecting an error, to said recovery means, and to said error reporting means, operative upon the condition that an error recurs during said second timeout period, for causing said error-reporting means in said particular node to propagate a permanent-error error report message, said error message identifying the type of error and the location (ID) at which the permanent error was detected; and,
   error report logging means in said particular node connected to at least one of said error report lines, for logging received error report messages propagated to said particular node.

2. The combination in accordance with claim 1 further comprising:
   first registering means in said node for registering the ID of a resource with which said node is paired to provide a redundant resource;
   comparison means connected to said first registering means and to said error reporting means for comparing said location ID in said received error report message with said registered ID of said resource; and,
   means responsive to said comparison means for activating said node upon the condition that said received error report message identifies, as a faulty resource, said resource with which said node is paired, to thereby cause said node to become active and take over operation for said faulty resource.

3. The combination in accordance with claim 2:
   second registering means in said node for registering status information indicating that said node is or is not paired with a redundant resource;
   third registering means in said node for registering the ID of said node;

said comparison means including means connected to said third registering means for comparing said location ID in said received error report message with said registered ID of said node; and, means connected to said comparison means and to said registering means for locking a damaged resource upon the conditions that said location ID in said error report message, logged after said second timeout period, identifies said particular node as a node which is part of a confinement area in which a module has failed and said second registering means indicates that said node is not paired with a redundant resource;

said locking means incuding means for generating a message which causes the affected resource to be marked as unavailable to further acceses to it.

4. The combination in accordance with claim 3 wherein said means for locking damaged resources further comprising:

means for monitoring memory access signals on said ACD bus, such that said BIU tracks the progress of memory access operations that span a memory bus to which said BIU is attached and a memory bus of another BIU with which said BIU is paired;

means responsive to the occurrence of this error situation (perm module error, my module, not married, MMA write, my half complete), the BIU which completed its part of the MMA write access must lock the memory location on its bus;

and wherein said means for generating a message included in said locking means which causes the affected resource to be marked as unavailable to further acceses to it includes means for issuing a Force Bad ECC (FBE) request on the MACD bus connected to said BIU, to thereby cause the MCU on said MACD bus to write a special ECC code into the addressed location, whereby any subsequent requests to said addressed location are rejected because the special ECC code is interpreted as an uncorrectable error by said node thereby preventing any further accesses to said location.

5. The combination in accordance with claims 1, 2, 3, or 4 further comprising:

an arbitration mechanism in said node for use in arbitrating among access requests contending for use of said MACD bus;

signaling means for signaling between said nodes sharing said MACD bus;

each one of said nodes being assigned a unique logical node number;

said arbitration mechanism providing the means for granting access to said MACD bus to one of said nodes in response to a request for access to said bus, said arbitration mechanism in each of said nodes comprising:

an access request FIFO including a number of time-order slots for storing received access requests in the order that they are made; and, arbiter means responsive to said request for access to said MACD bus and to said signaling means connected between said nodes, for keeping multiple requests separated into said time-order slots in said FIFO such that all requests made by multiple nodes, in a particular time-order slot, are serviced before any requests in the next time-order slot; and, wherein said means connected to said second means, operative during said second timeout period, for retrying accesses which are outstanding, further comprises:

means for separating pending access requests into a first group which includes write-access types of requests and a second group which includes read-access types of requests;

means for placing an access request of said first group into a first time-order slot of said access request FIFO; and, means for placing an access request of said second group in said second slot of said access request FIFO;

so that all accesses in the first group will be completed before any access in the second group is completed;

whereby all writes will occur before reads, to thereby guarantee that all of the read requests will be responded to with consistent information.

6. The combination in accordance with claim 1 further comprising:

a memory module;

means connecting one of said MCU nodes to said memory module;

a first one of said MACD busses being a primary bus;

a second one of said MACD busses being a backup bus;

bus switching means connected to said one MCU node, to said primary bus, and to said backup bus, said bus switching means being operative such that when in a first state said bus switching means connects said primary bus to said one MCU node and when in a second state said bus switching means connects said backup bus to said one MCU node, said switching means being initially in said first state;

error report logging means in said one MCU node connected to at least one of said bus error report lines (BERLs), for logging error report messages propagated to said one MCU node;

said error report logging means in said one MCU node including comparison means for issuing a comparison signal upon the condition that an error report message received during said second timeout period identifies an error that is the same as an error identified in an error report message heceived before said first timeout period; and, resource reconfiguration means in said one MCU node connected to said logging means and to said bus switching means;

said resource reconfiguration means including means responsive to said comparison signal for setting said bus switching means to said second state to thereby switch said memory module to said backup bus such that said one MCU node identifies said backup bus as a new primary bus, to thereby provide for recovery from a permanent error occurring in the primary memory bus confinement area.

* * * * *